(12) United States Patent
Dietrich et al.

(10) Patent No.: US 6,367,702 B1
(45) Date of Patent: Apr. 9, 2002

(54) METHOD AND APPARATUS FOR CONTROLLING COMMUNICATION BETWEEN A TERMINAL AND A NUMBER OF CHIP CARDS

(75) Inventors: Hanno Dietrich, Paderborn; Andreas Rottmann, Hagen, both of (DE)

(73) Assignee: Orga Kartensysteme GmbH, Paderborn (DE)

( * ) Notice: Subject to any disclaimer, the term of this patent is extended or adjusted under 35 U.S.C. 154(b) by 0 days.

(21) Appl. No.: 09/348,039

(22) Filed: Jul. 6, 1999

(30) Foreign Application Priority Data

Jul. 8, 1998 (DE) .......................................... 198 30 526

(51) Int. Cl.$^7$ ................................................ G06K 19/06
(52) U.S. Cl. .................... 235/492; 235/487; 235/380
(58) Field of Search ................................. 235/380, 382, 235/382.5, 379, 492, 487

(56) References Cited

U.S. PATENT DOCUMENTS 6,010,075 A * 1/2000 Ishifuji et al. ............... 235/492
6,032,858 A * 3/2000 Yazumi et al. ............... 235/379

OTHER PUBLICATIONS

Kreft; "Adaptive Identification for Non Contact Smart Cards for Smart Card Communication"; Patent No. 196 35 311; Publication Date: Mar. 12, 1998; Abstract.

* cited by examiner

Primary Examiner—Karl D. Frech
(74) Attorney, Agent, or Firm—Foley & Lardner

(57) ABSTRACT

The invention relates to a method and an apparatus for controlling communication between a terminal and a number of chip cards. Electromagnetic waves are continuously emitted by the terminal to form a communication zone within which communication between the terminal and the chip cards is initiated and sustained. After the sequence emitted by a first chip card, an identifier is generated in the terminal identifying the same chip card and is stored in the terminal.

19 Claims, 1 Drawing Sheet

Fig. 1
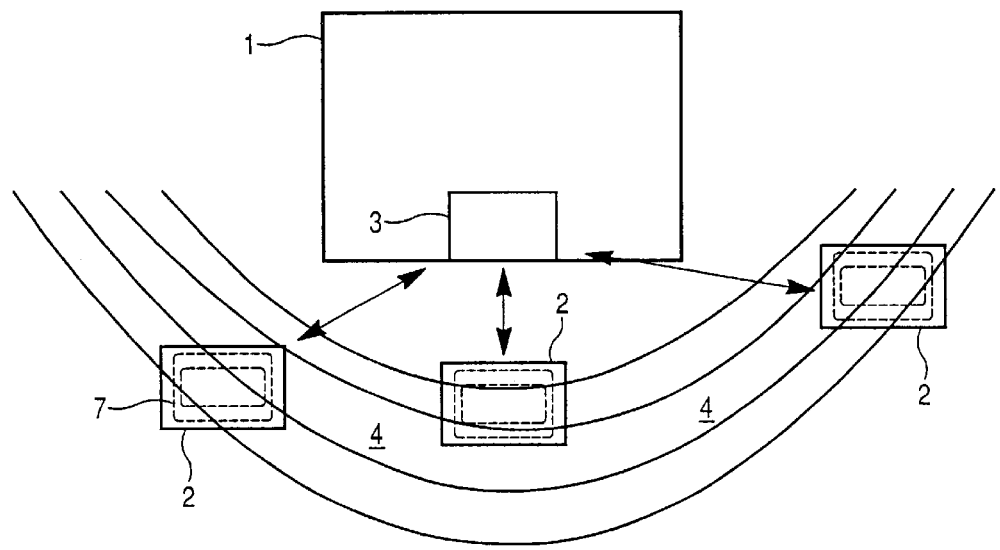
Fig. 2
| Send Reset | 6 |
| Transmit ATR | 8 |
| Generate | 9 |
| Transmit Code Word | 15 |
| Store Code Word | 16 |
| Transmit Charge Command | 17 |
| Execute Charge Command | 18 |
| Transmit Answer Sequence | 19 |
| Transmit End Command | 20 |
| Code Word Deleted | 21 |
↑ 5
Fig. 3
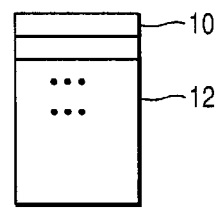

METHOD AND APPARATUS FOR CONTROLLING COMMUNICATION BETWEEN A TERMINAL AND A NUMBER OF CHIP CARDS

BACKGROUND OF THE INVENTION

1. Field of the Invention

The invention relates to a method and an apparatus for controlling communication between a terminal and a number of chip cards.

2. Description of the Related Art

German Patent 196 35 311 A1 discloses a method for controlling communication between a terminal and a number of chip cards, in which communication is maintained within a communication range between the terminal on the one hand and the chip cards of different manufacturers or different types on the other. After the signals emitted by the terminal have been decoded in the chip card and compared with characteristic information stored in the chip card, it can be determined whether the chip card corresponds to a certain signal frequency. Thus, groups of different type chip cards can be formed whose communication with the terminal can take place without interference from cards of another type.

With the prior art, however, communication with individual cards is not addressed. The invention is addressed to the problem of devising a method of and an apparatus for controlling communication between a terminal and a number of chip cards such that secure and rapid communication is assured between the terminal and the individual chip cards.

SUMMARY OF THE INVENTION

For the solution of this problem, a method according to the invention comprises the steps of: emitting electromagnetic waves by a terminal to form a communication zone for communication between the terminal and at least one of a plurality of chip cards; transmitting an answer-to-reset by one of the plurality of chip cards; generating an identifier by the terminal corresponding to the one chip card; and storing the identifier in the terminal.

In one embodiment, the identifier may be transmitted to the one chip card and stored therein. The identifier may be transmitted in an initial part of a communication between the terminal and the one chip card. The identifier may be deleted in an end part of a communication between the terminal and the one chip card with an end command emitted by the terminal.

An apparatus according to the invention comprises a terminal generating an electromagnetic field to form a communication zone and a plurality of chip cards arranged in the communication zone of the terminal. An identifier is generated and is stored in at least one of the terminal and one chip card from the plurality of chip cards, for identification of the one chip card.

The identifier may be in the form of a terminal-specific identification word. The identifier may be stored in a RAM memory of the chip card.

A different identifier may be assigned to each of a plurality of chip cards entering the communication zone. The different identifiers are generated according to the order of entry of a chip card into the communication zone.

Identifiers for a plurality of chip cards may be stored in an identification file of a memory of the terminal. A sequence of the identifiers is in the form of a dynamic order of identification, such that a storage location of an identifier corresponding to a particular chip card is overwritten in the memory of the terminal after communication between the terminal and the chip card.

BRIEF DESCRIPTION OF THE DRAWINGS

FIG. 1 is a schematic drawing of the communication of chip cards introduced into an electromagnetic field of a terminal.

FIG. 2 is a chart of the identification procedure at the beginning of a communication between the terminal and a chip card.

FIG. 3 is a block diagram of the file structure of a chip card.

DESCRIPTION OF THE PREFERRED EMBODIMENT

The invention has also been disclosed in related German patent application No. 198 30 526.5, filed Jul. 8, 1998, which is hereby incorporated by reference.

The advantage of the invention is to be seen especially in the fact that in the terminal an identifier is produced which in a simple manner identifies the corresponding chip card, so that communication between the terminal and the corresponding chip card can take place rapidly and securely.

The basic idea of the invention is to utilize the already existing identification of the chip card and convert it in the terminal to a communication-specific identification. In this way a kind of identification of the chip card attuned to the particular terminal can be made possible which will control the further conduct of the communication. Specific chip cards in the communication zone can be addressed and operated contactlessly while the transfer times during the progress of the communication are reduced, because when any communication sequence is transmitted between the terminal and the chip card in question, the identification is transferred with it, so that, with the increasing number of communication sequences, the saving of time in the transmission thereof is increased by the identification according to the invention.

An embodiment of the invention is further explained below with reference to the drawings.

FIG. 1 shows a terminal 1 which is configured as a card reading apparatus for wireless communication with one or more chip cards 2. The terminal has a transmitting and receiving unit 3 which radiates electromagnetic waves to form a communication zone 4. In the communication zone 4 the intensity of the electromagnetic waves is such that communication between the terminal 1 and a chip card 2 can begin with the emission of a reset sequence by the transmitting and receiving unit 3. Usually the communication is started by bringing the chip card 2 into the communication zone 4 and by powering the chip card connected therewith by a power-on-reset signal from the terminal 1.

As it can be seen in FIG. 2, an identification procedure 5 takes place immediately at the beginning of the communication. A reset sequence 6 of the terminal 1 is received by means of an antenna 7 integrated in the chip card 2 and is processed in a chip, not shown, of chip card 2. As a response to this reset signal 6 the chip card 2 sends an answer-to-reset (ATR) 8 with an identifying serial number or the like, which has a length of several bytes. In the next step 9 the generation of the identifier takes place in the terminal, and it is preferably a code word 10 that is stored in the terminal 1. Preferably, the code word 10 is stored in a given identification file in the memory of the terminal 1.

The data length of the code word 10 may depend upon a number of chip cards 2 assumed to be simultaneously in the communication zone 4; it is preferably 1 byte long, but can be longer or shorter depending on the protocol, so that several chip cards can be provided with different code words 10.

Then, in a step 15, this code word 10 along with the chip card's identifying serial number is transmitted to the chip card 2 identifiable thereby, so that in a further step 16, the code word can be stored in a RAM or EEPROM of the chip card. The transmission of the first communication sequence 17 from the terminal to the chip card 2 lastly takes place using the code word, now stored in memory in the chip card 2. The rest of the communication sequences of the communication procedure now take place using the code word 10 assigned to the chip card 2. If another chip card in the communication zone 4 of the terminal 1 sends a reset sequence 6 to the terminal 1 during a communication with the first chip card, then this communication with the first chip is temporarily interrupted so that the terminal 1 can send this second chip card an identifying code word 10. The communication between the first chip card and the terminal 1 is then resumed.

The communication between the transmitter/receiver unit 3 and the chip card 2 can be continued in order, for example, to charge a predetermined amount of money for the use of a parking lot. For this purpose the transmitter/receiver unit 3 transmits a charge command 17 as part of a communication sequence which subtracts a given amount from the sum of money stored in the chip card. In a further step 18 this command is executed in the chip card and the corresponding amount is subtracted in the EEPROM of the chip card.

Next the chip card 2 transmits, in a step 19, an answer sequence which contains the booking data concerning this payment procedure.

Optionally, provision can be made at the end of the communication procedure S for the transmitter/receiver unit 3 to emit an end command 20 with the command "delete identification word 10" which after being received by the chip card 2 produces in a further step 21 the deletion of the code word 10. This prevents any unwanted repeated addressing of the chip card 2 in case another chip card coming into the communication zone 4 has received the same identification word 10. Thus, double charging can be prevented. Alternatively, the terminal 1, by means of a time-delay circuit or by giving out the identification words in a given sequence, can prevent any so-called collision between several chip cards.

Preferably the identification word 10 is deposited in a RAM 12 of the chip card 2 and is called up by way of a predefined memory address. Alternatively the code word 10 can also be stored in an EEPROM of the chip card 2.

It is important in the invention that, by way of the identification word 10, one of a plurality of chip cards 2 can be associated unmistakably with the terminal 1 and is identifiable by it, so that a secure and quick communication can be performed between the terminal 1 and the chip card 2. After the communication is ended and the chip card 2 departs from the communication zone 4, the code word 10 can be given to another chip card. The terminal 1 assigns to the particular chip cards an established identification sequence as dynamic identification words according to the number and order of the entry of the chip cards into the communication zone 4.

The identifier 10 may be generated in the terminal 1 after receipt of the first sequence of each chip card 2 and temporarily stored in the terminal, and stored for as long as the communication between the terminal 1 on the one hand and the chip cards 2 on the other hand is not discontinued. Thereafter, the same identifier 10 can be used for identification during communication with other consecutively following chip cards.

After it has been generated, the identifier 10 may be transferred directly to the corresponding chip card 2, where it is stored. This results in a considerable saving of time, since the identifier 10 is a code word that can be substantially shorter than the original serial number deposited in each chip card 2 for its identification.

The identifier 10 is preferably a code word which, in view of the small number of chip cards 2 simultaneously within the communication zone 4, can be of short length, so that the transmission time can be substantially reduced.

At the same time, however, there must be the assurance that, after the end of the communication between the terminal 1 and a first chip card 2, and as long as the first chip card 2 is still in the communication zone 4, any new issuance of the same identification to another chip card 2 is prevented. Otherwise the first chip card 2 would also be addressed. This can be prevented preferably by having the terminal 1 send an end signal with a command that produces the deletion of the identifier 10 in the first card.

The identification word 10 may be stored only in a RAM memory in the chip card 2, so that after the chip card 2 has been removed from the communication zone 4, the identification word is automatically erased. This memory area can then be used for other purposes such as, for example, an operation of the chip card requiring contact.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modification as are suited to the particular use contemplated. It is intended that the scope of the invention be defined by the claims appended hereto, and their equivalents.

We claim:

1. A method of controlling communication between a terminal and a plurality of chip cards, comprising the steps of:

emitting electromagnetic waves by the terminal to form a communication zone for communication between said terminal and at least one of said plurality of chip cards;

transmitting an answer-to-reset by one of said plurality of chip cards;

generating an identifier by said terminal corresponding to said one chip card; and storing said identifier in said terminal.

2. The method according to claim 1, wherein said identifier is transmitted to said one chip card and stored therein.

3. The method according to claim 2, wherein said identifier is transmitted in an initial part of a communication between said terminal and said one chip card.

4. The method according to claim 3, wherein said identifier is deleted in an end part of a communication between said terminal and said one chip card with an end command emitted by said terminal.

5. The method according to claim 2, wherein said identifier is deleted in an end part of a communication between said terminal and said one chip card with an end command emitted by said terminal.

6. The method according to claim 5, further comprising the steps of:
said chip card subtracting a predetermined amount of money from an amount stored in said chip card in response to a command from said terminal; and
said chip card transmitting an answer sequence with booking data to said terminal.

7. The method according to claim 2, further comprising the steps of:
said chip card subtracting a predetermined amount of money from an amount stored in said chip card in response to a command from said terminal; and
said chip card transmitting an answer sequence with booking data to said terminal.

8. The method according to claim 1, wherein said identifier is deleted in an end part of a communication between said terminal and said one chip card with an end command emitted by said terminal.

9. A method of controlling communication between a terminal and a plurality of chip cards, comprising the steps of:
emitting electromagnetic waves by the terminal to form a communication zone for communication between said terminal and at least one of said plurality of chip cards;
transmitting an answer-to-reset by one of said plurality of chip cards;
generating an identifier by said terminal corresponding to said one chip card; and
storing said identifier in said terminal,
wherein identifiers for a plurality of chip cards are stored in an identification file of a memory of said terminal, a sequence of said identifiers being in the form of a dynamic order of identification, wherein a storage location of an identifier corresponding to a particular chip card is overwritten in the memory of said terminal after communication between said terminal and said chip card is terminated.

10. An apparatus for controlling communication comprising:
a terminal generating an electromagnetic field to form a communication zone; and
a plurality of chip cards arranged in said communication zone of said terminal,
wherein an identifier is generated by and is stored in at least one of said terminal and one chip card from said plurality of chip cards for identification of said one chip card.

11. The apparatus according to claim 10, wherein said identifier is in the form of a terminal-specific identification word.

12. The apparatus according to claim 10, wherein a different identifier is assigned to each of a plurality of chip cards entering said communication zone, said different identifiers being generated according to the order of entry of a chip card into said communication zone.

13. The apparatus according to claim 12, wherein said identifier is stored in a RAM memory of said chip card.

14. The apparatus according to claim 12, wherein said identifier has a length which is less than an identifying serial number for said chip card.

15. The apparatus according to claim 10, wherein said identifier is stored in a RAM memory of said chip card.

16. The apparatus according to claim 10, wherein said identifier has a length which is less than an identifying serial number for said chip card.

17. The apparatus according to claim 10, wherein said chip card subtracts a predetermined amount of money from an amount stored in said chip card in response to a command from said terminal; and said chip card transmits an answer sequence with booking data to said terminal.

18. An apparatus for controlling communication comprising:
a terminal generating an electromagnetic field to form a communication zone; and
a plurality of chip cards arranged in said communication zone of said terminal,
wherein an identifier is generated and is stored in at least one of said terminal and one chip card from said plurality of chip cards for identification of said one chip card, and
wherein identifiers for a plurality of chip cards are stored in an identification file of a memory of said terminal, a sequence of said identifiers being in the form of a dynamic order of identification, wherein a storage location of an identifier corresponding to a particular chip card is overwritten in the memory of said terminal after communication between said terminal and said chip card is terminated.

19. An apparatus for controlling communication comprising:
a terminal generating an electromagnetic field to form a communication zone; and
a plurality of chip cards arranged in said communication zone of said terminal,
wherein an identifier is generated and is stored in at least one of said terminal and one chip card from said plurality of chip cards for identification of said one chip card,
wherein a different identifier is assigned to each of a plurality of chip cards entering said communication zone, said different identifiers being generated according to the order of entry of a chip card into said communication zone, and
wherein identifiers for a plurality of chip cards are stored in an identification file of a memory of said terminal, a sequence of said identifiers being in the form of a dynamic order of identification, wherein a storage location of an identifier corresponding to a particular chip card is overwritten in the memory of said terminal after communication between said terminal and said chip card is terminated.

* * * * *